US011368669B2

(12) United States Patent
Zhang et al.

(10) Patent No.: US 11,368,669 B2
(45) Date of Patent: Jun. 21, 2022

(54) GENERATING STEREOSCOPIC LIGHT FIELD PANORAMAS USING CONCENTRIC VIEWING CIRCLES

(71) Applicant: Intel Corporation, Santa Clara, CA (US)

(72) Inventors: Fan Zhang, San Mateo, CA (US); Oscar Nestares, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 17/133,271

(22) Filed: Dec. 23, 2020

(65) Prior Publication Data

US 2021/0120225 A1 Apr. 22, 2021

Related U.S. Application Data

(63) Continuation of application No. 15/705,550, filed on Sep. 15, 2017, now Pat. No. 10,917,633.

(51) Int. Cl.
*H04N 13/344* (2018.01)
*G06T 3/00* (2006.01)
(Continued)

(52) U.S. Cl.
CPC ......... *H04N 13/344* (2018.05); *G06T 3/0018* (2013.01); *G06T 3/0087* (2013.01); *G06T 3/4038* (2013.01); *G06T 15/00* (2013.01); *H04N 5/23238* (2013.01); *H04N 13/296* (2018.05); *H04N 13/398* (2018.05)

(58) Field of Classification Search
CPC ........................... H04N 13/344; G06T 3/4038
See application file for complete search history.

(56) References Cited

U.S. PATENT DOCUMENTS 10,917,633 B2    2/2021   Zhang et al.
2012/0155786 A1*  6/2012  Zargarpour ........ H04N 5/23238
                                                    382/284
(Continued)

OTHER PUBLICATIONS

Birklbauer et al., "Panorama Light-Field Imaging," Institute of Computer Graphics, SIGGRAPH '12 ACMSIGGRAPH Talks, Los Angeles, CA, USA Aug. 5-9, 2012, 1 page.

(Continued)

*Primary Examiner* — Jerry T Jean Baptiste
(74) *Attorney, Agent, or Firm* — Hanley, Flight & Zimmerman, LLC

(57) ABSTRACT

An example system for generating stereoscopic light field panoramas includes at least one memory; and at least one processor to execute instructions to: access images of a scene captured by a plurality of cameras, the images including light field information associated with the scene; generate, based on first portions of the images, a first stereoscopic light field panorama for a first perspective associated with a left eye viewpoint of the scene, the left eye viewpoint associated with a left eye position on a first circle; and generate, based on second portions of the images, a second stereoscopic light field panorama for a second perspective associated with a right eye viewpoint of the scene, the right eye viewpoint associated with a right eye position on a second circle, the first circle being different than and concentric to the second circle.

21 Claims, 11 Drawing Sheets

400A

400B

(51) Int. Cl.
*H04N 5/232* (2006.01)
*H04N 13/296* (2018.01)
*H04N 13/398* (2018.01)
*G06T 3/40* (2006.01)
*G06T 15/00* (2011.01)

(56) References Cited

U.S. PATENT DOCUMENTS

| | | | | |
|---|---|---|---|---|
| 2016/0353089 | A1* | 12/2016 | Gallup | H04N 13/194 |
| 2017/0230587 | A1 | 8/2017 | Kanai et al. | |
| 2017/0236252 | A1* | 8/2017 | Nguyen | G06T 15/00 |
| | | | | 345/419 |
| 2018/0120573 | A1 | 5/2018 | Ninan et al. | |
| 2018/0205884 | A1* | 7/2018 | Hornung | H04N 5/23238 |
| 2018/0255288 | A1* | 9/2018 | Cole | H04N 21/4728 |
| 2018/0270464 | A1* | 9/2018 | Harviainen | H04N 13/128 |
| 2018/0357804 | A1* | 12/2018 | Forutanpour | H04N 17/002 |
| 2019/0037200 | A1 | 1/2019 | Niemelä et al. | |

OTHER PUBLICATIONS

Shum et al., "Rendering with Concentric Mosaics," Computer Graphic Proceedings, SIGGRAPH 99, ACM, Jul. 1, 1999, 8 pages.
Richardt et al., "Megastereo: Constructing High-Resolution Stereo Panoramas," 2013 IEEE Conference on Computer Vision and Pattern Recognition, Jun. 2013, 8 pages.
Kauff et al., "Interactive 3-D Video Representation and Coding Technologies," Proceedings of the IEEE, vol. 93 Issue 1, Jun. 27, 2005, 13 pages.
Anderson et al., "Jump: virtual reality video," ACM Transactions on Graphics (TOG) 35.6, USA, Dec. 2016, 15 pages.
Peleg et al., "Omnistereo: Panoramic stereo imaging," IEEE Transactions on Pattern Analysis and Machine Intelligence Mar. 23, 2001, 12 pages.
United States Patent and Trademark Office, "Non Final Office Action," Issued in connection with U.S. Appl. No. 15/705,550, dated Jun. 11, 2019, 24 pages.
United States Patent and Trademark Office, "Final Office Action," Issued in connection with U.S. Appl. No. 15/705,550, dated Dec. 23, 2019, 28 pages.
United States Patent and Trademark Office, "Advisory Action," Issued in connection with U.S. Appl. No. 15/705,550, dated Mar. 27, 2020, 3 pages.
United States Patent and Trademark Office, "Non Final Office Action," Issued in connection with U.S. Appl. No. 15/705,550, dated Apr. 29, 2019, 24 pages.
United States Patent and Trademark Office, "Notice of Allowance and Fee(s) Due," Issued in connection with U.S. Appl. No. 15/705,550, dated Sep. 21, 2020, 9 pages.
European Patent Office, "Extended European Search Report," issued in connection with European patent No. 18187153.4, dated Feb. 25, 2019, 13 pages.

* cited by examiner

100

300

400A

500

700

GENERATING STEREOSCOPIC LIGHT FIELD PANORAMAS USING CONCENTRIC VIEWING CIRCLES

RELATED APPLICATION(S)

This patent arises from a continuation of U.S. patent application Ser. No. 15/705,550, which was filed on Sep. 15, 2017. U.S. patent application Ser. No. 15/705,550 is hereby incorporated herein by reference in its entirety. Priority to U.S. patent application Ser. No. 15/705,550 is claimed.

BACKGROUND

Virtual reality (VR) systems may include VR capture systems and VR video generating algorithms. For example, such VR video generating algorithms may use both monocular cues and binocular cues for depth perception.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
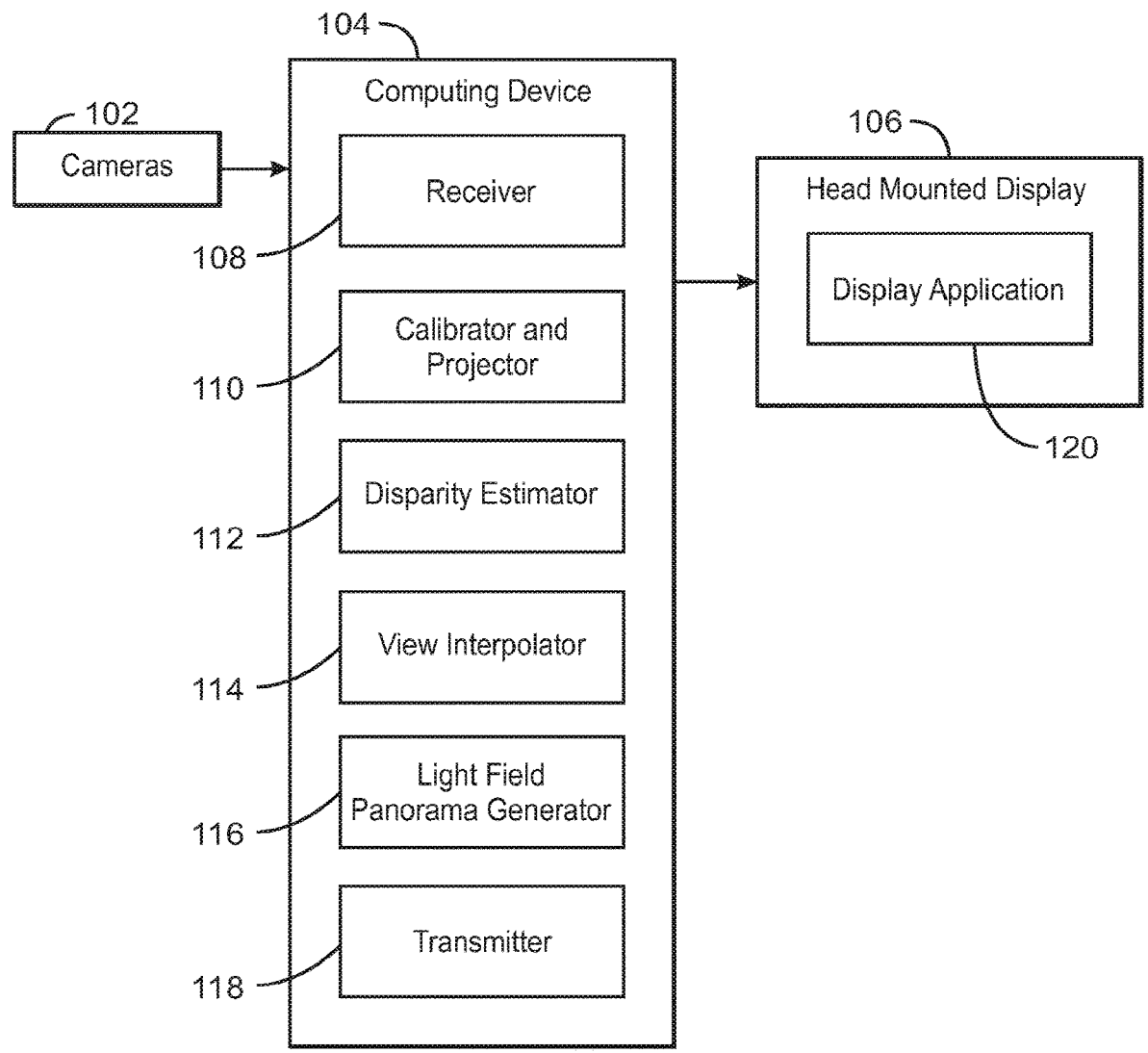
FIG. 1 is a block diagram illustrating an example system for generating stereoscopic light field panoramas using concentric viewing circles.

As discussed above, VR video generating algorithms may use both monocular cues and binocular cues for depth perception. As used herein, monocular cues provide depth information when viewing a scene with one eye. Binocular cues provide depth information when viewing a scene with both eyes. For example, stereopsis and convergence are examples of binocular cues that can be used to provide viewers with depth perception. In particular, stereopsis includes introducing binocular disparities that may be processed in the visual cortex of the brain to yield depth perception. However, such existing systems may not include the monocular cue of motion parallax. Therefore, when viewers move in a VR scene, the viewers may not perceive relative motion of different objects in the VR scene as in reality. This lack of motion parallax may thus weaken the viewers' sense of reality when viewing the VR scene. Parallax is a displacement or difference in the apparent position of an object viewed along two different lines of sight, and is measured by the angle or semi-angle of inclination between those two lines. Due to foreshortening, nearby objects may show a larger parallax than farther objects when observed from different positions, so parallax can be used to determine distances. Motion parallax, as used herein, thus refers to movement of objects in the distance appearing to be slower than the objects close to a camera or viewer.

The present disclosure relates generally to techniques for generating stereoscopic light field panoramas using concentric viewing circles. As used herein, a panorama is an image generated by stitching together slices of one or more other images of a light field to create an unbroken view of a particular scene. In particular, the concentric viewing circles may be used to select slices to be stitched together. Stereoscopic refers to the use of stereopsis or the perception of depth and three dimensional structure on the basis of visual information deriving from two eyes by individual with binocular vision. Specifically, the techniques described herein include an apparatus, method and system for generating stereoscopic light field panoramas using concentric viewing circles. An example system includes a receiver to receive a plurality of synchronized images. The system also includes a calibrator and projector to calibrate the synchronized images, undistort the synchronized images, and project the undistorted images to a sphere to generate undistorted rectilinear images. The system further includes a disparity estimator to estimate a disparity between neighboring views of the undistorted rectilinear images to determine an optical flow between the undistorted rectilinear images. The system includes a view interpolator to perform in-between view interpolation on the undistorted rectilinear images based on the optical flow. The system also further includes a light field panorama generator to generate a stereoscopic light field panorama for a plurality of perspectives using concentric viewing circles. The system may also include a transmitter to transmit stereoscopic light field panorama corresponding to a particular perspective to a head mounted display.

The techniques described herein thus enable motion parallax to be included in presented VR video. For example, by using concentric circles rather than two viewpoints within the same viewing circle, the motion parallax effect can be introduced into generated light field panoramas representing different perspectives. As translation of the head mounted display is detected, different perspectives may be displayed accordingly. In particular, the introduced motion parallax effect improves the depth perception of users viewing the VR using head mounted displays. For example, the techniques described herein can allow users to feel motion parallax as they move their head and thus provide a more immersive viewing experience. Moreover, the techniques also provide an application for a device for displaying the generated light field panoramas.

FIG. 1 is a block diagram illustrating an example system for generating stereoscopic light field panoramas using concentric viewing circles. The example system is referred to generally by the reference number 100 and can be implemented in the computing device 900 below in FIG. 9 using the method 800 of FIG. 8 below.

The example system 100 includes a plurality of cameras 102, a computing device 104, and a head mounted display 106. The computing device 104 includes a receiver 108, a calibrator and projector 110, a viewing circle generator 112, a view interpolator 114, a light field video generator 116, and a transmitter 118. The head mounted display 106 includes a display application 120.

As shown in FIG. 1, a plurality of cameras 102 may capture video to be converted into a light field panorama. For example, the cameras 102 may be arranged into a camera ring. In some examples, the cameras may include wide angle lenses. For example, the cameras 102 may be eight cameras with wide angle lenses having a field of view of at least 220 degrees. Such a configuration may provide a good balance of image quality and performance. For example, using a field of view of at least 220 degrees can be used to collect more light rays than normal lenses and helps light field reconstruction, enabling more parallax. In some examples, a larger number of cameras may also be used to provide more parallax.

The computing device 104 may receive images from the cameras 102 and output light field panoramas corresponding to particular perspectives to the head mounted display 106. In some examples, the images may be temporally synchronized using audio. The receiver 108 may receive the plurality of synchronized images and send the plurality of images to the calibrator and projector 110. The calibrator and projector 110 may perform a variety of preprocessing on the images. For example, the calibrator and projector 110 can calibrate the synchronized images. The synchronized images may be calibrated using intrinsic and extrinsic parameters as explained below. The calibrator and projector 110 can also undistort the images. For example, the images can be projected to a sphere to generate undistorted rectilinear images. The disparity estimator 112 can then estimate a disparity between neighboring views of the undistorted rectilinear images to determine an optical flow between the undistorted rectilinear images. The optical flow can then be used by the view interpolator 114 to perform in-between view interpolation on the undistorted rectilinear images. For example, in-between view interpolation may be performed between undistorted rectilinear images corresponding to neighboring cameras. In some examples, the interpolation may also be based on a smoothness factor that may vary with a speed of detected movement of a head mounted display, as described below. The light field panorama generator 116 can generate stereoscopic light field panoramas for a number of perspectives using concentric viewing circles. For example, the panoramas may be slices of an image plane corresponding to views of each concentric viewing circle, as described in greater detail with respect to example concentric viewing circles of FIGS. 4A and 4B below. The transmitter 118 may then transmit particular light field panoramas corresponding to particular perspectives as requested from the display application 120 of the head mounted display 106.

The display application 120 may thus be configured to detect translation of the head mounted display (HMD). For example, the display application 120 can detect a translation of the HMD and send a request for an updated perspective based on the updated coordinates of the HMD. The display application 120 may be configured to receive the generated light field panoramas from the transmitter 118 and display the light field panoramas in the head mounted display 106. For example, the received light field panorama may be from the perspective corresponding to the latest coordinates of the HMD. Translation of the head mounted display by a user, for example to the right or to the left, may result in a noticeable motion parallax due to the updated light field panoramas being displayed, resulting in an improved virtual reality experience that is more realistic in appearance.

The diagram of FIG. 1 is not intended to indicate that the example system 100 is to include all of the components shown in FIG. 1. Rather, the example system 100 can be implemented using fewer or additional components not illustrated in FIG. 1 (e.g., additional cameras, computing devices, components, head mounted displays, etc.).

Figure 2:
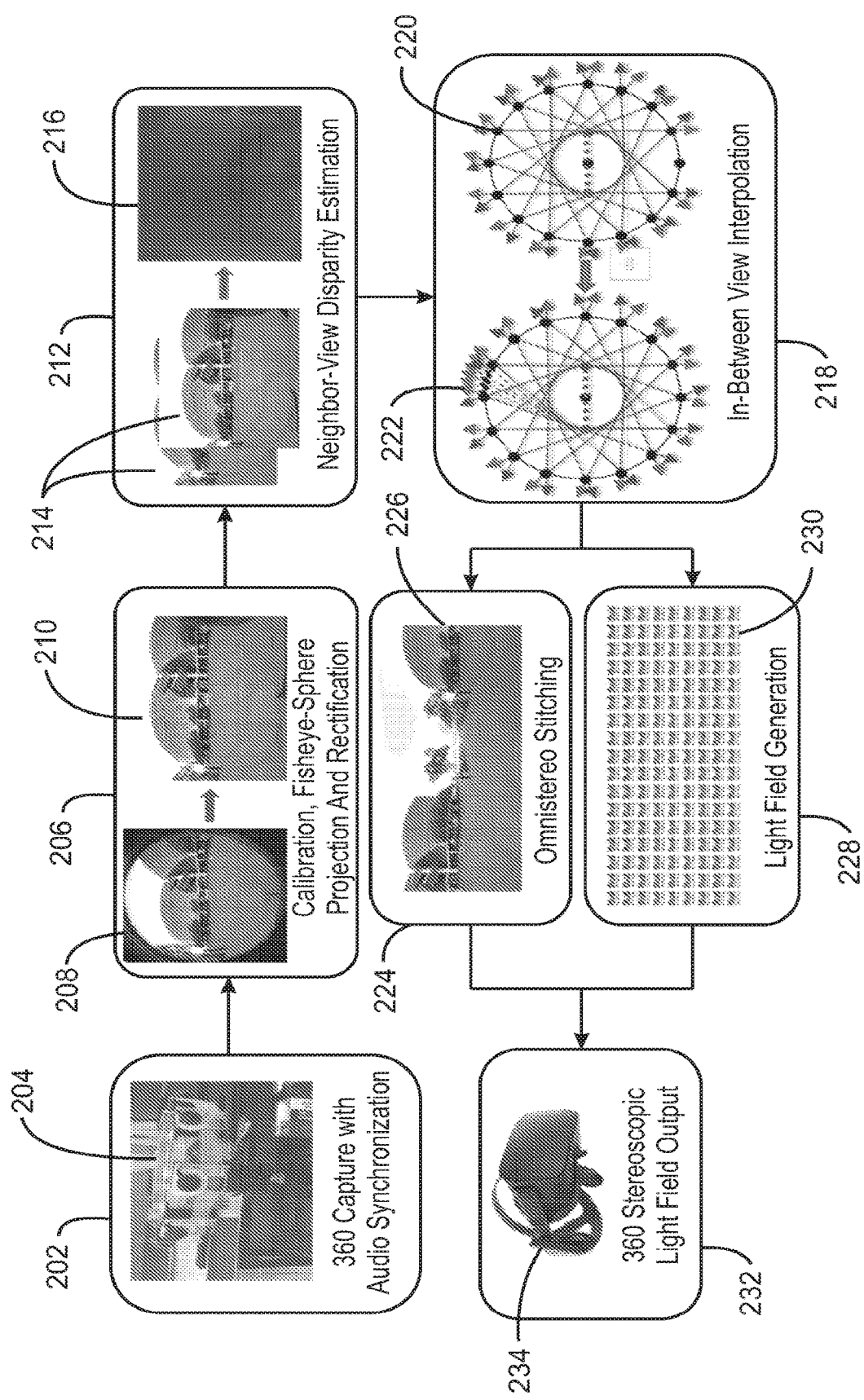
FIG. 2 is a flow chart illustrating an example system pipeline for generating stereoscopic light field panoramas using concentric viewing circles.

FIG. 2 is a flow chart illustrating an example system pipeline for generating stereoscopic light field panoramas using concentric viewing circles. The example process is generally referred to by the reference number 200 and can be implemented using the system 100 above or the computing device 900 below.

At block 202, a 360 degree video capture with audio synchronization is performed. For example, a number of cameras may be used to take video of a scene. As shown in the image within block 202, the 360 degree video capture may be performed using a ring of cameras, or camera ring 204. In some examples, the cameras in the camera ring may include wide angle lenses. For example, the cameras may include eight cameras with wide angle lenses. In some examples, the wide angle lenses may have a field of view (FOV) of 220 degrees or more. In some examples, any suitable audio may be used for synchronization. For example, ambient noises in the capture environment may be used to synchronize the cameras by synching the audio at a given point in time across cameras and capturing images in the same point in time.

At block 206, a calibration image, fisheye to sphere projection, and rectification is performed. In some examples, a calibration of fisheye images 208 may be performed based on intrinsic and extrinsic parameters of the cameras used to capture the fisheye images 208. Intrinsic parameters may include the parameters intrinsic to the camera itself, such as the focal length and lens distortion. In some examples, a checkerboard may be used to perform intrinsic calibration. Extrinsic parameters are parameters used to describe the transformation between the camera and its external world. For example, the fisheye video 208 may appear circular and need to be undistorted. The fisheye to sphere 210 projection may be performed to generate a corresponding rectilinear image. In some examples, the cameras may have various offsets needing calibration. Rectification may be used to transform images by projecting two-or-more images onto a common image plane. For example, instead of maintaining perfect camera alignment, rectification of images may be used to align the images taken by cameras that may be misaligned. The resulting images may have no vertical disparities nor any fisheye distortion.

At block 212, a neighbor-view disparity estimation is performed. For example, a disparity estimation may be performed between neighboring views 214. In some examples, a disparity map 216 can be generated based on the disparity estimation. For example, the disparity map 216 in block 212 shows disparity between two images using various shades of gray. The optical flow between each image pair may be estimated using the disparity map generated by the neighbor-view image disparity estimation.

At block 218, an in-between view interpolation is performed. For example, pairs of views 222 in the same direction may be interpolated based on a smoothness factor. More interpolation may be performed to generate more smoothness. In some examples, the smoothness factor may be based on view density threshold and a head motion speed threshold. For example, the amount of interpolation may be based on a detected speed of translation of a head mounted display exceeding the head motion speed threshold. For example, below a predetermined view density threshold, more interpolation can be used for fast head motion beyond a head motion speed threshold. However, above the view density threshold, less interpolation may be used for fast head motion exceeding the head motion speed threshold. For example, for two cameras with a quite large baseline, with 10 views interpolated in between, if a user moves very fast from left to right, the user may immediately feel jittering effects. The user may also feel uncomfortable because of the discontinuity between different views. However, if the user moves slowly, the user may not feel sick because the eyes of the user may have a certain time to adjust for the discontinuity. In another example, if 500 views are interpolated resulting in a view density above the view density threshold, then users may be unable to notice the difference with their heads moving fast or slow. In some examples, even only 400 views are interpolated, users may not feel the difference. In some examples, different view density thresholds may be for different people that also affects the interpolation number. For example, the view density threshold may be adjusted depending on the sensitivity of the user. Some users may be sensitive to 30 frames per second (FPS), and some users may be sensitive to 60 FPS. Since the former can tolerate a lower view density, a lower view density threshold may be set. By contrast, the latter cannot tolerate a lower view density and may feel sick if the view density is low, so a higher view density threshold may be used for such users. The result of interpolation may be thousands of interpolated views 222 with an FOV of 220 degrees, for example. In some examples, other FOV values may be used depending on the number of cameras used. For example, the total FOV to be captured may be based on Equation 8. For example, given a fixed camera arm length, camera number, and parallax budget, can FOV be calculated accordingly.

At block 224, an omnistereo stitching is performed. For example, slices may be taken from interpolated images and spliced together to form a panorama 226. In some examples, the omnistereo light field techniques described herein may be used to perform the stitching. For example, two different concentric viewing circles may be used for the left and right eye viewpoints. In some examples, a fixed r inter-pupillary distance may be used as a constraint for the concentric viewing circles, as described in greater detail below. For example, the fixed pupillary distance value may be 6.4 centimeters as it corresponds to an average human pupillary distance. In some examples, the inter-pupillary distance may be based on the actual pupillary distance of the user.

At block 228, a light field generation is performed. For example, a panorama may be generated for each perspective by stitching together slices from appropriate concentric viewing circles. A perspective, as used herein, refers to a viewpoint from a particular set of coordinates. The resulting light field 230 may be thousands of panoramas for each perspective. In some examples, the light field generation may be performed offline and stored for later retrieval. In some examples, the light field generation may be performed online and rendered in real-time.

At block 232, 360 degree stereoscopic light field panoramas are output. In some examples, a stereoscopic light field panoramas may be output. The light field panoramic panoramas may be displayed using an application on a head mounted display 234. For example, the application may enable head tracking and head coordinates to be used to allow a perspective for each particular position to be fetched and displayed from the light field panoramic video. New perspectives for a given updated coordinate may be fetched from a database in response to detected translation of the head mounted display to the updated coordinate. Thus, a translation of a viewer's head may result in a different perspective with noticeably motion parallax. For example, objects in the background may move with less speed than objects in the foreground.

This process flow diagram is not intended to indicate that the blocks of the example system pipeline 200 are to be executed in any particular order, or that all of the blocks are to be included in every case. Further, any number of additional blocks not shown may be included within the example system pipeline 200, depending on the details of the specific implementation.

Figure 3:
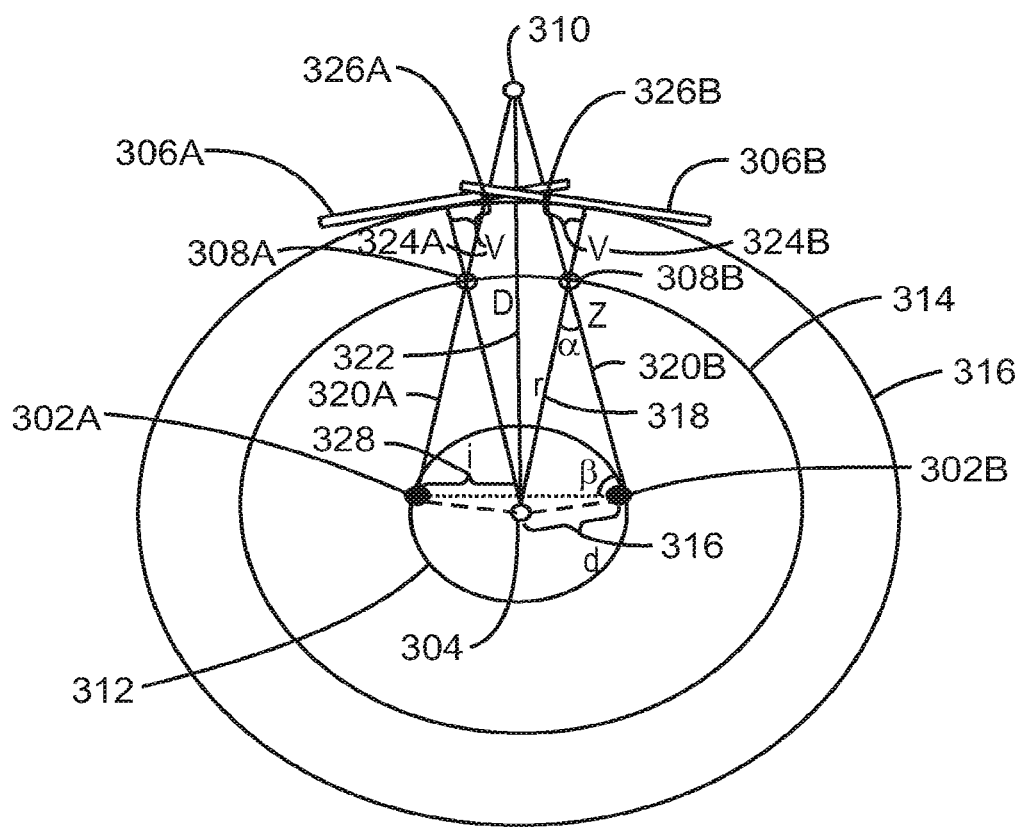
FIG. 3 is a diagram illustrating an example omnistereo technique using slices from a pair of overlapping image planes for generating stereoscopic light field panoramas.

FIG. 3 is a diagram illustrating an example omnistereo technique using slices from a pair of overlapping image planes for generating stereoscopic light field panoramas. The example display is generally referred to by the reference number 300 and can be implemented in the computing device 900 below. For example, the display 300 can be used by the view interpolator 114 of FIG. 1, the view interpolator 938 of the computing device 900 of FIG. 9 below, or the view interpolator module 1012 of the computer readable media 1000 of FIG. 10 below.

FIG. 3 shows a left eye position 302A and a right eye position 302B having an axis of a rotation 304. FIG. 3 further includes a pair of overlapping plane images 306A and 306B being viewed by eye positions 302A and 302B, respectively. The display 300 also includes optical centers 308A and 308B, corresponding to eye positions 302A and 302B, respectively. The display 300 further includes a scene point 310, and a viewing circle 312. The eye positions 302A and 302B are on opposing ends of the viewing circle 312. FIG. 3 also includes an optical center circle 314 created by rotating a camera and an image plane circle 316 indicating a rotation trajectory of an image plane For example, rotation of a camera may generate a moving trajectory that falls on the optical center circle 314. The display 300 also includes a viewing circle radius 316 of the viewing circle 312 and a camera ring radius 318 of length r. The display 300 further includes distances 320A, 320B of length Z between scene point 310 and the left eye 302A and right eye 302B, respectively. The display 300 further includes distance 322 between scene point 310 and the middle point between left eye 302A and right eye 302B. Furthermore, the display 300 includes distances 324A, 324B of size V, indicating the distance between strips 326A and 326B and centers of overlapping plane images 306A, 306B, respectively. The display further includes a distance 328 between left eye position 302A and a midpoint between left eye position 302A and right eye position 302B with a length i.

In some examples, the relations among the viewing circle radius 316, an inter-pupillary distance 2i, the camera ring radius r 318, the distance Z 320A, 320B between the scene point 310 and the left/right eye, the distance D 322 between the scene point 310 and the middle point 304 between the left and right eye positions 302A and 302B may be expressed by the following equations:

$$\tan\beta = \frac{D}{i} \qquad \text{Eq. 1}$$

$$\sin\alpha = \frac{d}{r} \qquad \text{Eq. 2}$$

$$\sin\beta = \frac{D}{Z} \qquad \text{Eq. 3}$$

$$\alpha = \sin^{-1}\left(\frac{i}{r*\sin\left(\tan^{-1}\left(\frac{D}{i}\right)\right)}\right) \approx \sin^{-1}\left(\frac{i}{r}\right) \qquad \text{Eq. 4}$$

The distance 2v 324A and 324B between the left strip 326A and right strip 326B can be determined by the inter-pupillary distance 2i, the camera ring radius r, the image width w, and the horizontal field of view (FOV) as follows:

$$v = w * \frac{2\sin^{-1}\left(\frac{i}{r}\right)}{FOV} \qquad \text{Eq. 5}$$

In some examples, the horizontal FOV may be the valid FOV after fisheye image calibration, undistortion, and rectification. Assuming that the distance between the nearest object and the camera is one meter, and the inter-pupillary distance is 6.4 centimeters, then d=1.00051187(i). Therefore, in some examples, an approximated value for distance 324 of d≈i may be used with a limitation of nearest objects being at least a meter away from any edge of the camera ring during capture.

The diagram of FIG. 3 is not intended to indicate that the example display 300 is to include all of the components shown in FIG. 3. Rather, the example display 300 can be implemented using fewer or additional components not illustrated in FIG. 3 (e.g., additional plane images, viewing circles, etc.).

Figure 4A:
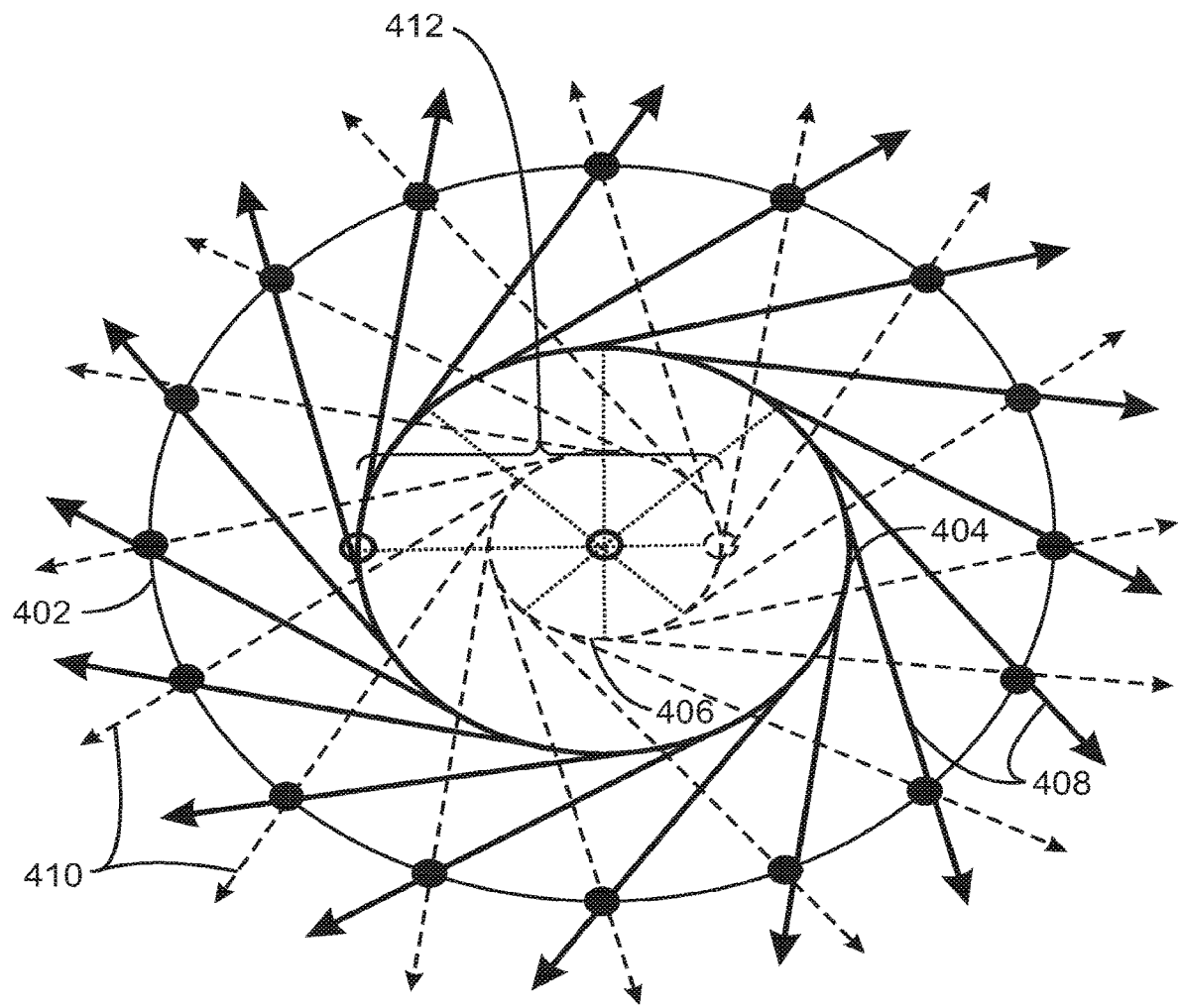
FIG. 4A is a diagram illustrating an example pair of concentric viewing circles for generating stereoscopic light field panoramas.

FIG. 4A is a diagram illustrating an example pair of concentric viewing circles for generating stereoscopic light field panoramas. The example pair of concentric viewing circles is generally referred to by the reference number 400A and can be generated using the computing device 900 below. For example, the viewing circles 400A can be generated using the view interpolator 114 of FIG. 1, the view interpolator 938 of the computing device 900 of FIG. 9 below, or the view interpolator module 1012 of the computer readable media 1000 of FIG. 10 below.

FIG. 4A shows a ring of cameras 402. Inside the camera ring 402, are a set of concentric circles 404 and 406, associated with two sets of views 408 and 410, indicated by bold arrows and dashed arrows, respectively. For examples, views 408 may correspond to a left eye and views 410 may correspond to a right eye. An inter-pupillary distance 412 is indicated by sets of dotted lines.

Figure 4B:
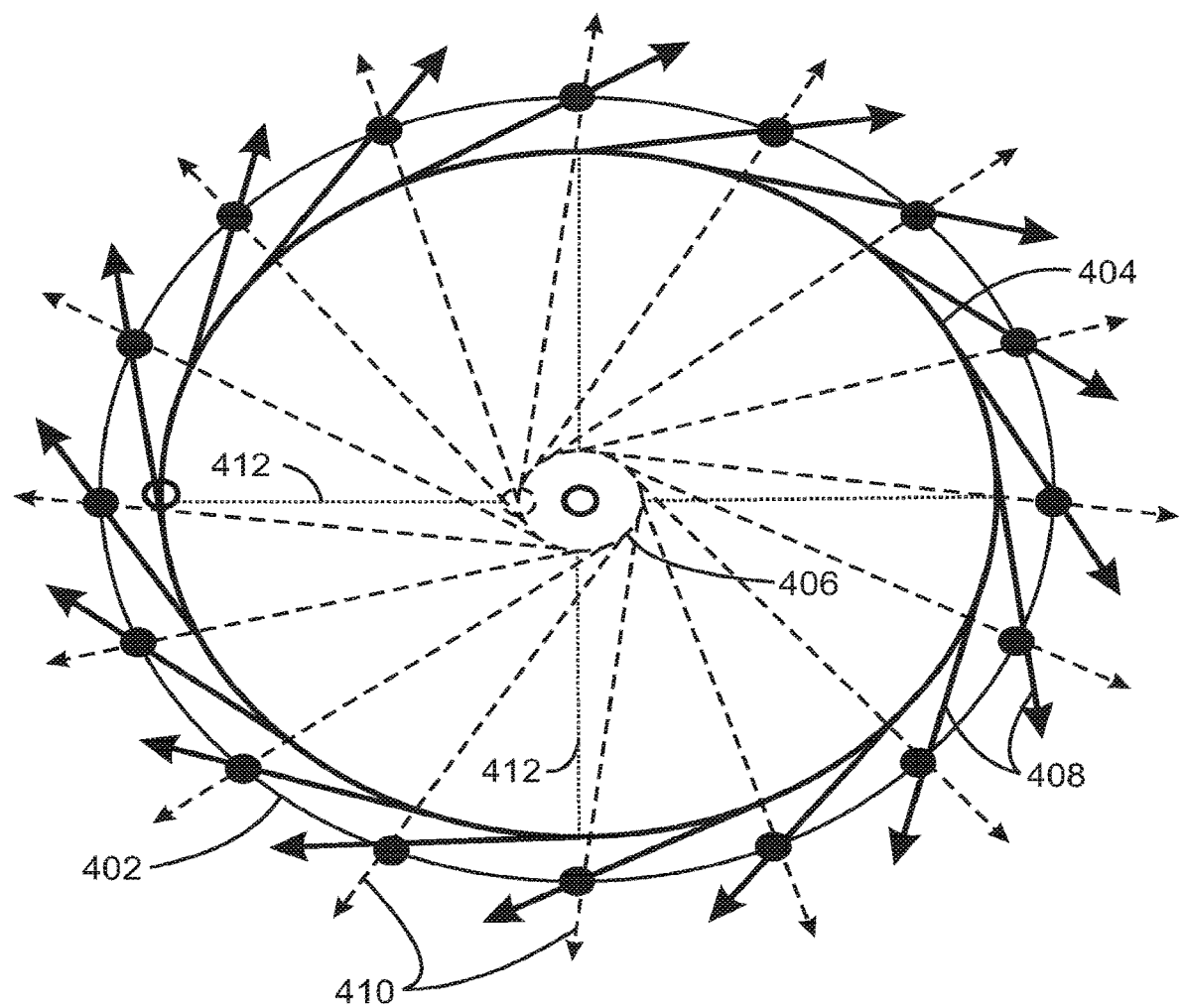
FIG. 4B is a diagram illustrating another example pair of concentric viewing circles for generating stereoscopic light field panoramas.

As shown in FIG. 4A, instead of restricting the left eye and the right eye to share the same viewing circle, the two eyes may use two different concentric viewing circles. In addition, the inter-pupillary distance may be used as a constraint to determine which circles to use at each moving position. In some examples, the inter-pupillary distance may be set to 6.4 centimeters, as an average inter-pupillary distance for eyes. In some examples, any other suitable value may be used, such as the actual inter-pupillary distance of a user. For example, the inter-pupillary distance may be set based on the actual inter-pupillary distance of a user. For example, the distance between the farthest points in each circle may be within the inter-pupillary distance. In particular, a light-field omnistereo ray construction can use a left eye viewing circle with radius i cm and right eye viewing circle with radius |6.4−i| cm. As shown in FIG. 4A, if i is less than 6.4, left/right eye positions locate at the opposite sides of the two viewing circles. Otherwise, the left/right eye positions may locate at the same sides of the two viewing circles as shown in FIG. 4B below. In this way, different stereo panoramas can be constructed with different values of i to simulate head translation at each viewing direction. Since the viewing circles are concentric, the amount of motion parallax can be determined by how much inter-pupillary distance the camera ring can support.

An omnistereo technique can thus use circular projection to construct 360 stereo panoramas from two sets of light rays. Given the ring of cameras 402, to perceive stereo vision from the captured scene, the left-eye and right-eye positions are located in the viewing circles 404 and 406, respectively, as shown in FIG. 4A. Left-eye and right-eye panoramas are then constructed from rays on the tangent lines in the clockwise and counter-clockwise directions, respectively, of the viewing circles 404 and 406, as shown in FIG. 4A. For example, the left-eye panorama can be stitched by using the vertical strips at the right of the images. The right-eye panorama is stitched by using the vertical strips at the left of the images.

The diagram of FIG. 4A is not intended to indicate that the example viewing circles 400A are to include all of the components shown in FIG. 4A. Rather, the example viewing circles 400A can be implemented using fewer or additional components not illustrated in FIG. 4A (e.g., additional cameras, viewing circles, inter-pupillary distances, etc.).

FIG. 4B is a diagram illustrating another example pair of concentric viewing circles for generating stereoscopic light field panoramas. The example viewing circles are generally referred to by the reference number 400 and can be implemented in the computing device 900 below. For example, the concentric viewing circles 400 can be generated using the view interpolator 114 of FIG. 1, the view interpolator 938 of the computing device 900 of FIG. 9 below, or the view interpolator module 1012 of the computer readable media 1000 of FIG. 10 below.

FIG. 4B shows similarly numbered components named and described in greater detail with respect to FIG. 4A above. In FIG. 4B, however, the left and right eye positions have been translated to the left. In addition, FIG. 4B a light-field omnistereo ray construction can use a left eye viewing circle with radius i cm and right eye viewing circle with radius |6.4−i| cm. However, in FIG. 4B, i is greater than 6.4. Thus, with the translation to the left in FIG. 4B, the left and right eye positions are located at the same sides of the two viewing circles.

The diagram of FIG. 4B is not intended to indicate that the example viewing circles 400 is to include all of the components shown in FIG. 4B. Rather, the example viewing circles 400 can be implemented using fewer or additional components not illustrated in FIG. 4B (e.g., additional cameras, viewing circles, inter-pupillary distances, translations, etc.). For example, a translation from FIG. 4A to the right may result in different viewing circles for the right and left eyes.

Figure 5:
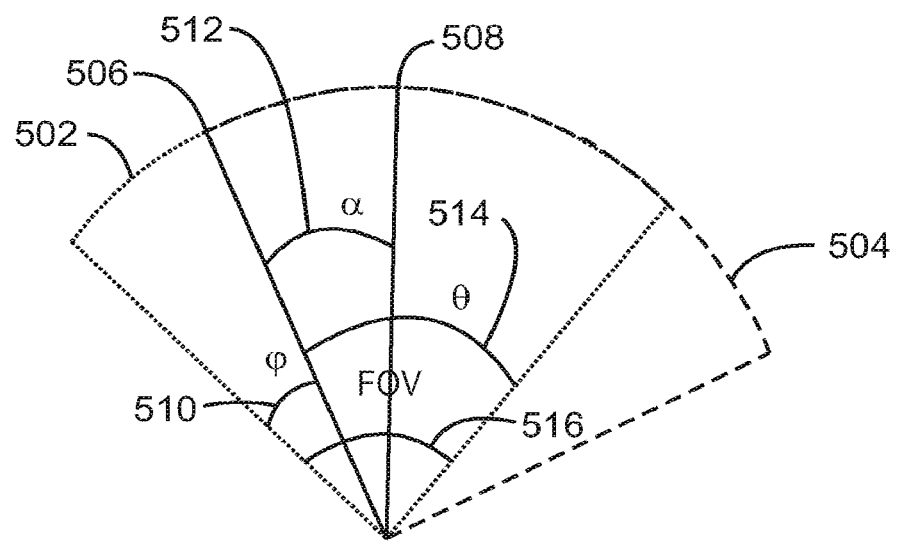
FIG. 5 is a diagram illustrating an example pair of overlapping views for generating stereoscopic light field panoramas.

FIG. 5 is a diagram illustrating an example pair of overlapping views for generating stereoscopic light field panoramas. The example views are generally referred to by the reference number 500 and can be implemented in the computing device 900 below. For example, the views 500 can be generated using the view interpolator 114 of FIG. 1, the view interpolator 938 of the computing device 900 of FIG. 9 below, or the view interpolator module 1012 of the computer readable media 1000 of FIG. 10 below.

FIG. 5 shows a set of views 502 and 504, indicated by overlapping gray and dotted black lines, respectively. For example, view 502 may have been captured by one camera and view 504 may have been captured by another camera. FIG. 5 further illustrates a left strip location 506, an image middle point 508, and a number of angles 510, 512, 514, and 516. In some examples, as described with respect to FIG. 6 below, an inter-pupillary distance may be calculated using the based on angles 510, 512, 514, and 516, given additional values as described below. In particular, angle 510 is associated with a nonoverlapping portion of view 502. Angle 512 is associated with a portion of the overlap between views 502 and 504 to the left of the image middle point 508. Angle 514, in particular, is associated with an overlapping portion of views 502 and 504. Angle 516 is associated with the entirety of view 502.

The diagram of FIG. 5 is not intended to indicate that the example views 500 is to include all of the components shown in FIG. 5. Rather, the example views 500 can be implemented using fewer or additional components not illustrated in FIG. 5 (e.g., additional views, fields of view, etc.).

Figure 6:
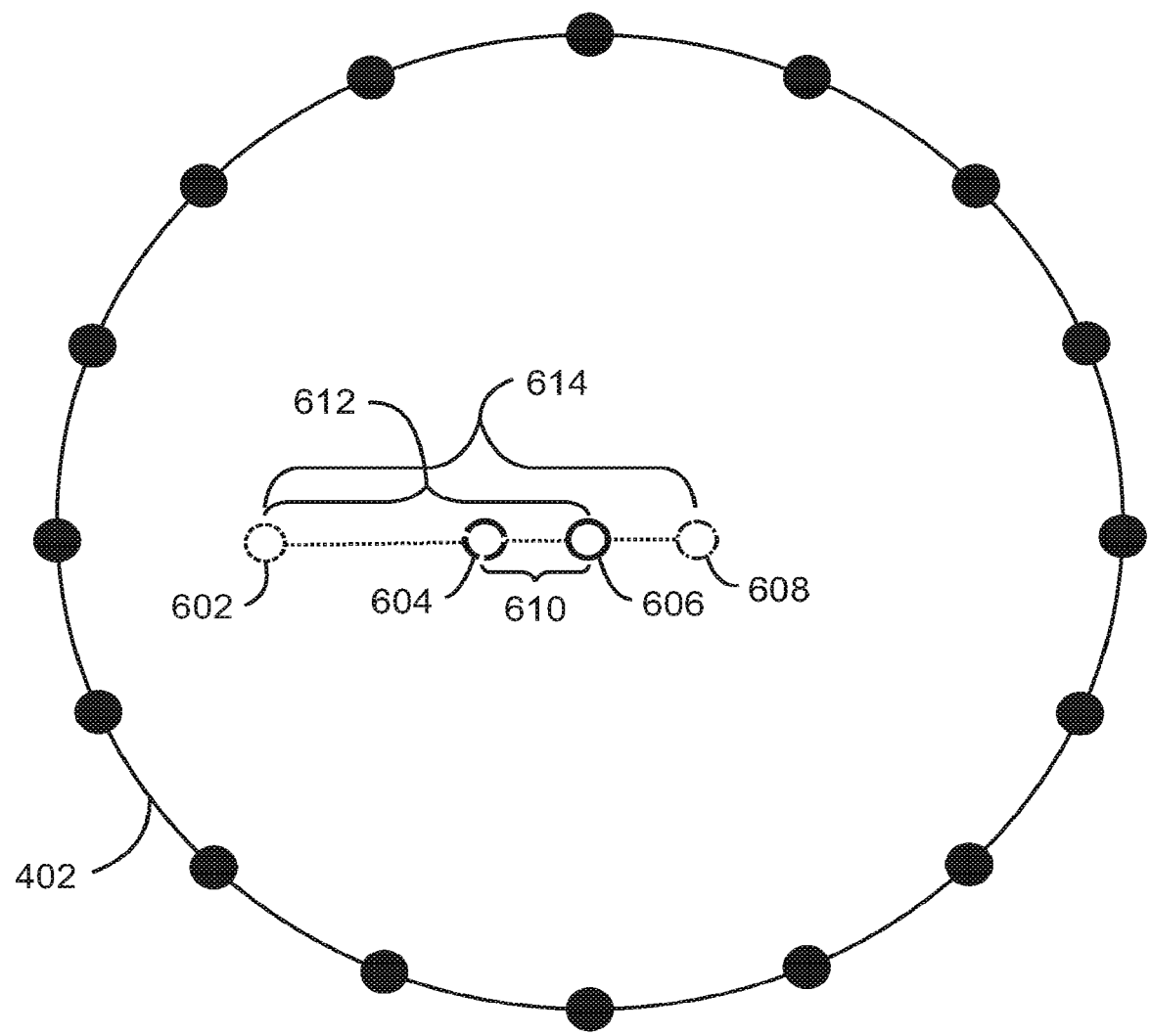
FIG. 6 is a diagram illustrating an example supported head translation for generated stereoscopic light field panoramas.

FIG. 6 is a diagram illustrating an example supported head translation for generated stereoscopic light field panoramas. The example head translation is generally referred to by the reference number 600 and can be supported in the computing device 900 below. For example, the head translation 600 can be supported using the computing device 104 of FIG. 1 above, the light field panorama generator 930 of the computing device 900 of FIG. 9, or the light field panorama generator module 1014 of computer readable media 1000 of FIG. 10 below.

FIG. 6 shows an example camera ring providing supported head translation using techniques described herein. As shown in FIGS. 5 and 6, a supported inter-pupillary distance for a particular camera ring configuration can be calculated using the following equations:

$$\phi = \frac{360}{n} \quad \text{Eq. 6}$$

$$\theta = FOV - \varphi \quad \text{Eq. 7}$$

$$i = r * \sin\alpha = r * \sin\left(\frac{FOV}{2} - \frac{360}{n}\right) \quad \text{Eq. 8}$$

In the example of FIG. 6, given an example camera ring radius r of 21.8, an example FOV of 77, and an example number of cameras n of 14, then:

$$i = r * \sin\left(\frac{FOV}{2} - \frac{360}{n}\right) = 21.8 * \sin\left(\frac{77}{2} - \frac{360}{14}\right) = 4.82 \quad \text{Eq. 9}$$

Thus, using an omni-directional stereo light field generation algorithm, the above configuration can support about 1.18 centimeters of head translation 612. In some examples, any other suitable values for the camera ring radius, FOV, and number of cameras can be used. For example, different configurations may be set according to equation 8. For near eye displays, the light field parallax may not be very large, but for displays further form the eye, a larger parallax may be used. The parallax may also be calculated using all of the factors of equation 8. In some examples, if the camera number is lower, the FOV may be increased. However, if the camera number is small, then to get good optical flow result, the camera ring radius may also be small so that the baseline between two neighboring cameras are reasonable.

In some examples, a practical and affordable camera array 402 may be used to capture enough data to support head translation and at the same time deliver comfortable viewing experience. From equation 8 above, the amount of head translation can be determined by the camera ring radius r, the FOV of the camera, and the number of cameras n in the camera ring 402. An increased radius r or number of cameras in the camera ring 402 may pose more difficulties for stereo panorama stitching, while take up more storage, and reducing the mobility of the camera rig. Therefore, in some examples, the FOV of each of the cameras of a camera ring 402 may be increased. Thus, instead of using typical fisheye cameras, each of the fisheye cameras can be modified by changing the integrated fisheye lens into a super wide angle lens. For example, 94×120 FOV fisheye lenses can be modified to 220×220 FOV super wide angle lenses. In one example, 8 cameras with 220×220 FOV may be used on a 9.6 cm camera ring. In this example, using a number of cameras of 8 and with an FOV of 220 and a camera ring radius r of 9.6 can provide an allowable head translation 612 of 8.7 centimeters.

The diagram of FIG. 6 is not intended to indicate that the example camera ring 600 is to include all of the components shown in FIG. 6. Rather, the example camera ring 600 can be implemented using fewer or additional components not illustrated in FIG. 6 (e.g., additional cameras, camera rings, and different combinations of camera number, FOV, ring radius, etc.).

Figure 7:
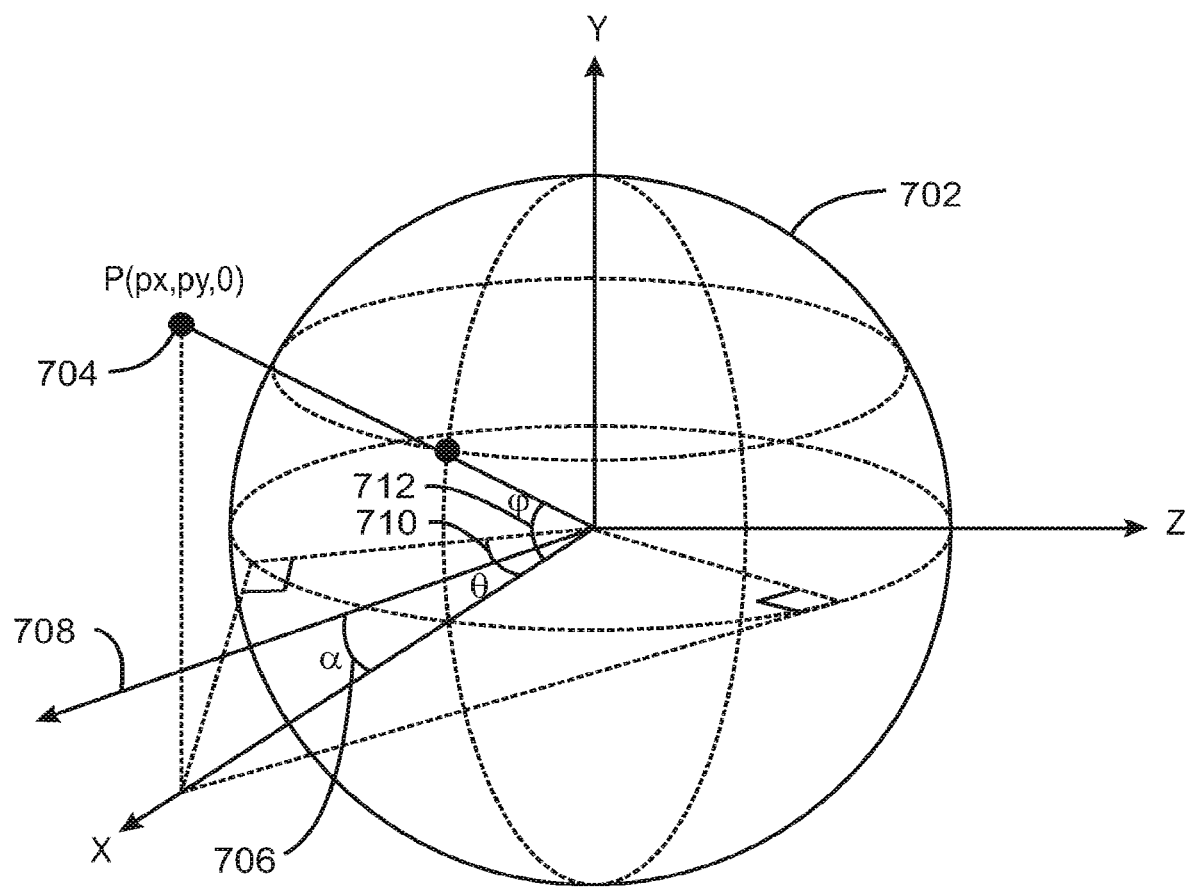
FIG. 7 is a diagram illustrating an example point in a three dimensional space included in generated stereoscopic light field panoramas.

FIG. 7 is a diagram illustrating an example point in a three dimensional space included in generated stereoscopic light field panoramas. The example three dimensional space is generally referred to by the reference number 700 and can be used by the computing device 900 below.

FIG. 7 shows an example three dimensional space represented by a sphere 702 with an example point 704 to be perceived in left and right views. A first angle $\alpha$ 706 in the XY plane indicates a rotational displacement of an arrow 708 representing a viewing direction of a head from the X axis. The three dimensional space 700 also includes a second angle $\theta$ 710 in the XZ plane. A third angle $\varphi$ 712 in the XY plane represent a rotational displacement of point 704 from the X axis. In some examples, when the left and right eyes are located at two different viewing circles, the left and right views may suffer from inconsistency in both x and y directions due to non-horizontally-aligned cameras. For example, given a point 704 $P(p_x, p_y, 0)$ in the example 3D space 700, the coordinates of the point 704 in the left and right perspective views after circular projection with inter-pupillary distance as 2i may be expressed using the following equation:

$$\begin{bmatrix} f\tan(\frac{\pi}{2} - \theta 1 - \alpha) \\ f\tan(\varphi 1)\sec(\frac{\pi}{2} - \theta 1 - \alpha) \end{bmatrix} \begin{bmatrix} f\tan(\theta 2 - \frac{\pi}{2} - \alpha) \\ f\tan(\varphi 2)\sec(\theta 2 - \frac{\pi}{2} - \alpha) \end{bmatrix} \quad \text{Eq. 10}$$

where f is the focal length, i1 is the viewing circle radius for eye1, i2 is the viewing circle radius for eye2 and:

$$\theta 1 = \cos^{-1}\left(\frac{i1}{p_x}\right) \quad \text{Eq. 11}$$

$$\phi 1 = \tan^{-1}\left(\frac{p_y}{\sqrt{p_x^2 - i1^2}}\right) \quad \text{Eq. 12}$$

$$\theta 2 = \cos^{-1}\left(\frac{i2}{p_x}\right) \quad \text{Eq. 13}$$

$$\phi 2 = \tan^{-1}\left(\frac{p_y}{\sqrt{p_x^2 - i2^2}}\right) \quad \text{Eq. 14}$$

$$i = i1 + i2 \quad \text{Eq. 15}$$

using angles α 706, θ 710, and φ 712 shown in FIG. 7, for each eye. With different viewing circles, the same scene point 704 may thus be perceived inconsistently in the left and right views. Such inconsistency may cause visual fatigue for viewers. However, controlling the nearest object to be located at least one meter away from the camera array and constraining the viewing circle radius within a reasonable range, the inconsistency between the left and right view may be too small to be noticeable. Thus, in some examples, the camera array may be located at least one meter from the nearest object to be captured in the images, and the viewing circle radius may be based on the depth distribution of the scene, as described by θ 710 in equation 10 above. For example, in an outdoor scene, wherein the nearest objects may be far away, θ may be almost 90 degrees, thus a large camera ring can be used and the inconsistency may be small. However, in indoor scenes, objects may be closer, and a smaller camera ring may be used accordingly.

The diagram and description of FIG. 7 is not intended to indicate that the techniques described herein are to include all of the components shown in FIG. 7. Rather, the techniques described herein can be implemented using fewer or additional components not illustrated in FIG. 7 (e.g., additional constraints, scene points, etc.).

Figure 8:
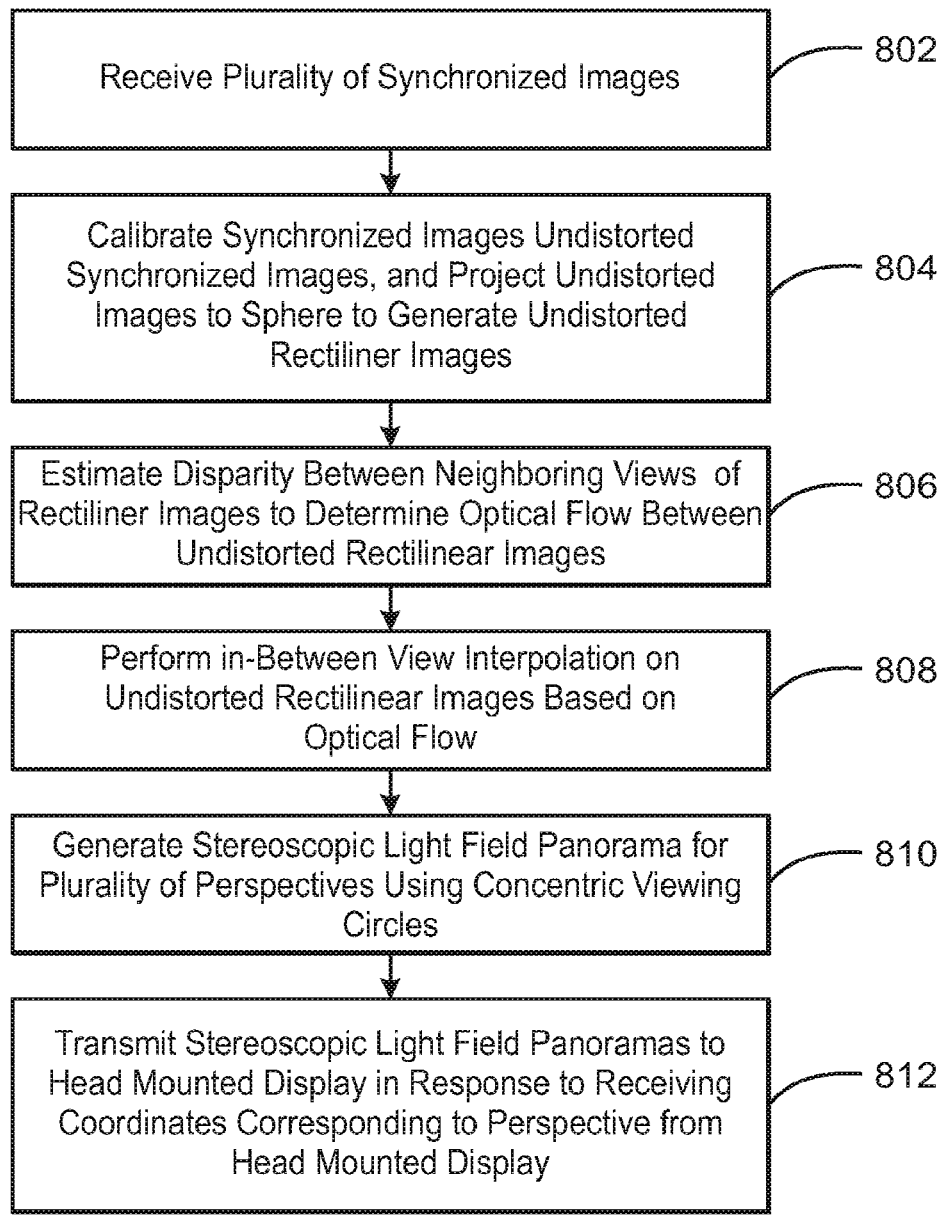
FIG. 8 is a flow chart illustrating a method for generating stereoscopic light field panoramas using concentric viewing circles.

FIG. 8 is a flow chart illustrating a method for generating stereoscopic light field panoramas using concentric viewing circles. The example method is generally referred to by the reference number 800 and can be implemented using the computing device 104 of FIG. 1 above, the processor 902 of the computing device 900 of FIG. 9 below, or the processor 1002 executing the instructions of computer readable media 1000 of FIG. 10 below.

At block 802, a processor receives a plurality of synchronized images. For example, the images may have been captured using a ring of cameras. In some examples, the cameras may have a field of view of 220 degrees or greater. In some examples, the images may be synchronized using audio. For example, the audio may be ambient noise from an environment. In some examples, the audio can be matched from different cameras and video frames from the same point in time can be used to generate a panorama. In some examples, the processor may cause a camera to capture the synchronized images.

At block 804, the processor calibrates the synchronized images, undistorts the synchronized images, and projects the undistorted images to a sphere to generate undistorted rectilinear images. For example, the synchronized images may be calibrated using intrinsic and extrinsic camera parameters. In some examples, the processor may also rectify the undistorted rectilinear images to compensate for camera misalignment.

At block 806, the processor estimates a disparity between neighboring views of the undistorted rectilinear images to determine an optical flow between the undistorted rectilinear images.

At block 808, the processor performs in-between view interpolation on the undistorted rectilinear images based on the optical flow. For example, the processor can perform in-between view interpolation on undistorted rectilinear images from neighboring cameras. In some examples, the interpolation may also be based on a smoothness factor. For example, the smoothness factor may be based on the speed of translation of a head mounted display. In some examples, the smoothness factor may be higher with lower speed detected from the head mounted display. In some examples, the smoothness factor may be lower with higher speed detected from the head mounted display.

At block 810, the processor generates a stereoscopic light field panorama for a plurality of perspectives using concentric viewing circles. In some examples, the processor can perform omnistereo stitching using the concentric viewing circles. For example, the processor can stitch a plurality of slices of a plurality of image planes corresponding to the concentric viewing circles for each perspective, as described in FIGS. 4A and 4B above. In some examples, the concentric viewing circles can be constrained based on a fixed interpupillary distance.

At block 812, the processor transmits the stereoscopic light field panorama corresponding to a perspective to a head mounted display in response to receiving coordinates corresponding to the perspective from the head mounted display. In some examples, the processor can then receive updated coordinates corresponding to a detected translation from a head mounted display and sending an updated stereoscopic light field panorama corresponding to an updated perspective to the head mounted display. The updated stereoscopic light field panorama displayed on the head mounted display may enable a user to detect motion parallax corresponding to the translation of the head mounted display.

This process flow diagram is not intended to indicate that the blocks of the example process 800 are to be executed in any particular order, or that all of the blocks are to be included in every case. Further, any number of additional blocks not shown may be included within the example process 800, depending on the details of the specific implementation.

Figure 9:
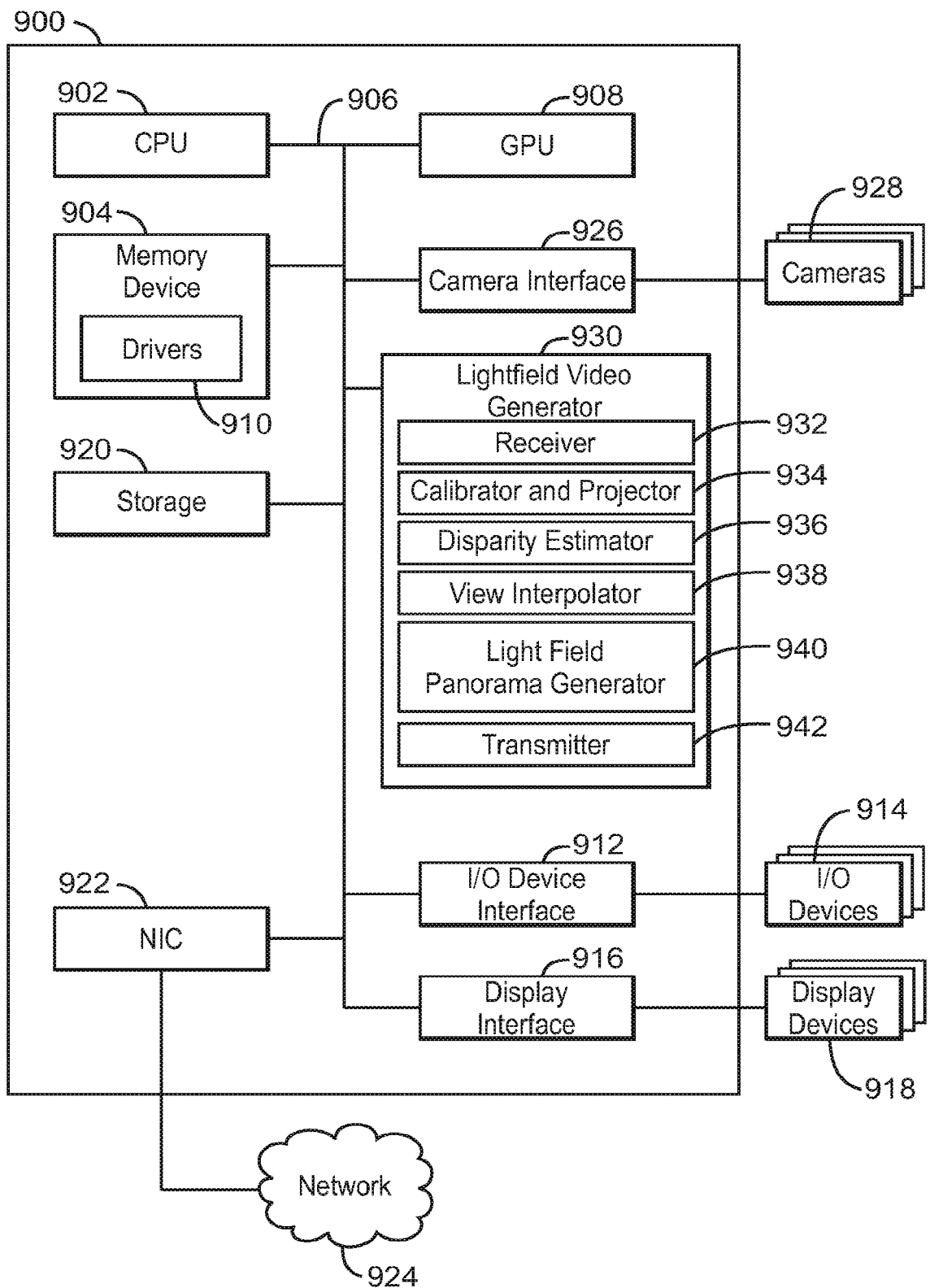
FIG. 9 is block diagram illustrating an example computing device that can generate stereoscopic light field panoramas using concentric viewing circles.

Referring now to FIG. 9, a block diagram is shown illustrating an example computing device that can generate stereoscopic light field panoramas using concentric viewing circles. The computing device 900 may be, for example, a laptop computer, desktop computer, tablet computer, mobile device, or wearable device, among others. In some examples, the computing device 900 may be a smart camera or a digital security surveillance camera. The computing device 900 may include a central processing unit (CPU) 902 that is configured to execute stored instructions, as well as a memory device 904 that stores instructions that are executable by the CPU 902. The CPU 902 may be coupled to the memory device 904 by a bus 906. Additionally, the CPU 902 can be a single core processor, a multi-core processor, a computing cluster, or any number of other configurations. Furthermore, the computing device 900 may include more than one CPU 902. In some examples, the CPU 902 may be a system-on-chip (SoC) with a multi-core processor architecture. In some examples, the CPU 902 can be a specialized digital signal processor (DSP) used for image processing. The memory device 904 can include random access memory (RAM), read only memory (ROM), flash memory, or any other suitable memory systems. For example, the memory device 904 may include dynamic random access memory (DRAM).

The memory device 904 can include random access memory (RAM), read only memory (ROM), flash memory, or any other suitable memory systems. For example, the memory device 904 may include dynamic random access memory (DRAM). The memory device 904 may include device drivers 910 that are configured to execute the instructions for device discovery. The device drivers 910 may be software, an application program, application code, or the like.

The computing device 900 may also include a graphics processing unit (GPU) 908. As shown, the CPU 902 may be coupled through the bus 906 to the GPU 908. The GPU 908 may be configured to perform any number of graphics operations within the computing device 900. For example, the GPU 908 may be configured to render or manipulate graphics images, graphics frames, videos, or the like, to be displayed to a user of the computing device 900.

The memory device 904 can include random access memory (RAM), read only memory (ROM), flash memory, or any other suitable memory systems. For example, the memory device 904 may include dynamic random access memory (DRAM). The memory device 904 may include device drivers 910 that are configured to execute the instructions for generating light field panoramas. The device drivers 910 may be software, an application program, application code, or the like.

The CPU 902 may also be connected through the bus 906 to an input/output (I/O) device interface 912 configured to connect the computing device 900 to one or more I/O devices 914. The I/O devices 914 may include, for example, a keyboard and a pointing device, wherein the pointing device may include a touchpad or a touchscreen, among others. The I/O devices 914 may be built-in components of the computing device 900, or may be devices that are externally connected to the computing device 900. In some examples, the memory 904 may be communicatively coupled to I/O devices 914 through direct memory access (DMA).

The CPU 902 may also be linked through the bus 906 to a display interface 916 configured to connect the computing device 900 to a display device 918. The display devices 918 may include a display screen that is a built-in component of the computing device 900. The display devices 918 may also include a computer monitor, television, or projector, among others, that is internal to or externally connected to the computing device 900. The display device 918 may also include a head mounted display. For example, the head mounted display may receive stereoscopic light field panorama corresponding to a particular perspective. For example, the head mounted display can detect a translation and send updated coordinates corresponding to the perspective to the receiver 932 described below.

The computing device 900 also includes a storage device 920. The storage device 920 is a physical memory such as a hard drive, an optical drive, a thumbdrive, an array of drives, a solid-state drive, or any combinations thereof. The storage device 920 may also include remote storage drives.

The computing device 900 may also include a network interface controller (NIC) 922. The NIC 922 may be configured to connect the computing device 900 through the bus 906 to a network 924. The network 924 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 900 further includes a camera interface 926. For example, the camera interface 926 may be connected to a plurality of cameras 928. In some examples, the plurality of cameras may be arranged in a camera ring. In some examples, the cameras 928 may include wide angle lenses. For example, the wide angle lenses may be designed based on a target range of parallax, a radius of a camera ring of the cameras, and a target field of view for the wide angle lenses according to Equations 1-5 above. In some examples, cameras 928 may be used to capture a 360 angle video of a scene.

The computing device 900 further includes a light field panorama generator 930. For example, the light field panorama generator 930 can be used to generate stereoscopic light field panorama videos to be viewed in a head mounted display. The light field panorama generator 930 can include a receiver 932, a calibrator and projector 934, a viewing circle generator 936, a view interpolator 938, a light field video generator 940, and a transmitter 942. In some examples, each of the components 932-942 of the light field panorama generator 930 may be a microcontroller, embedded processor, or software module. The receiver 932 can receive a plurality of synchronized images. For example, the synchronized images may include objects that were at least a meter away from a circle of cameras used to capture the synchronized images. In some examples, the plurality of synchronized images are captured using a plurality of wide angle lenses and synchronized using audio. The calibrator and projector 934 can calibrate the synchronized images, undistort the synchronized images, and project the undistorted images to a sphere to generate undistorted rectilinear images. In some examples, the calibrator and projector 934 can also rectify the undistorted rectilinear images to compensate for a camera misalignment. The disparity estimator 936 can estimate a disparity between neighboring views of the undistorted rectilinear images to determine an optical flow between the undistorted rectilinear images. The view interpolator 938 can perform in-between view interpolation on the undistorted rectilinear images based on the optical flow. For example, the interpolation can be based on a smoothness factor. The smoothness factor may indicate the density of the interpolation to be applied. In some examples, the smoothness factor may be based on a detected speed of translation of the head mounted display. For example, a higher speed of translation may result in a lower smoothness factor. A lower speed may result in a higher smoothness factor. The light field video generator 940 can generate a stereoscopic light field panorama for a plurality of perspectives using concentric viewing circles. For example, the concentric viewing circles can be generated based on a fixed inter-pupillary distance. The stereoscopic light field panoramas may each include a plurality of slices of an image plane corresponding to the concentric viewing circles for each perspective. The transmitter 942 can transmit a stereoscopic light field panorama corresponding to a particular perspective to a head mounted display.

The block diagram of FIG. 9 is not intended to indicate that the computing device 900 is to include all of the components shown in FIG. 9. Rather, the computing device 900 can include fewer or additional components not illustrated in FIG. 9, such as additional buffers, additional processors, and the like. The computing device 900 may include any number of additional components not shown in FIG. 9, depending on the details of the specific implementation. Furthermore, any of the functionalities of the receiver 932, the calibrator and projector 934, the viewing circle generator 936, the view interpolator 938, the light field video generator 940, and the transmitter 942, may be partially, or entirely, implemented in hardware and/or in the processor 902. For example, the functionality may be implemented with an application specific integrated circuit, in logic implemented in the processor 902, or in any other device. For example, the functionality of the light field video generator 930 may be implemented with an application specific integrated circuit, in logic implemented in a processor, in logic implemented in a specialized graphics processing unit such as the GPU 908, or in any other device.

Figure 10:
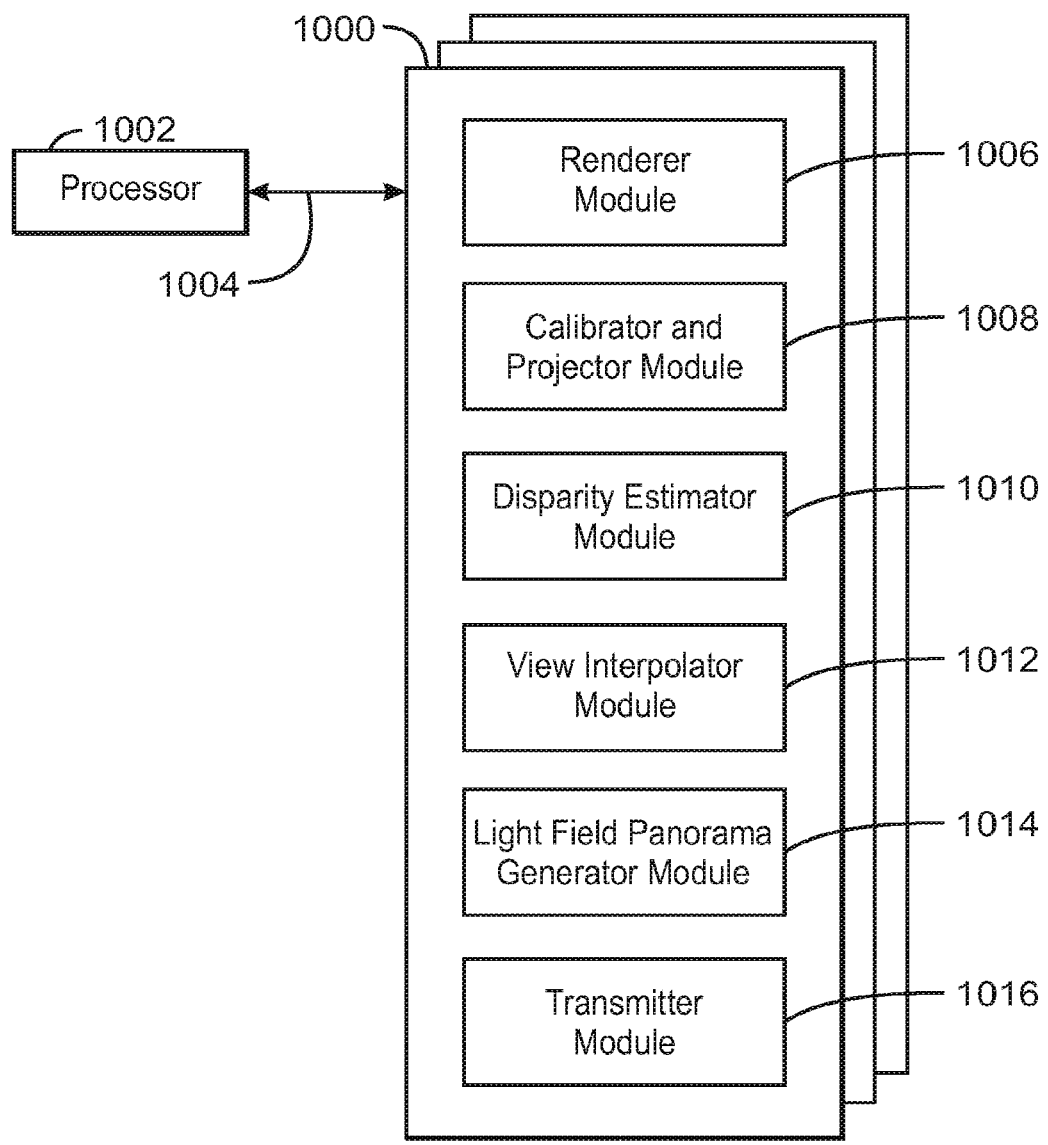
FIG. 10 is a block diagram showing computer readable media that store code for generating stereoscopic light field panoramas using concentric viewing circles.

FIG. 10 is a block diagram showing computer readable media 1000 that store code for generating stereoscopic light field panoramas using concentric viewing circles. The computer readable media 1000 may be accessed by a processor 1002 over a computer bus 1004. Furthermore, the computer readable medium 1000 may include code configured to direct the processor 1002 to perform the methods described herein. In some embodiments, the computer readable media 1000 may be non-transitory computer readable media. In some examples, the computer readable media 1000 may be storage media.

The various software components discussed herein may be stored on one or more computer readable media 1000, as indicated in FIG. 10. For example, a receiver module 1006 may be configured to receive a plurality of synchronized images. For example, the synchronized images may be synchronized using audio. A calibrator and projector module 1008 may be configured to calibrate the synchronized images, undistort the synchronized images, and project the undistorted images to a sphere to generate undistorted rectilinear images. In some examples, the calibrator and projector module 1008 may also be configured to rectify the undistorted rectilinear images to compensate for camera misalignment. A disparity estimator module 1010 may be configured to estimate a disparity between neighboring views of the undistorted rectilinear images to determine an optical flow between the undistorted rectilinear images. A view interpolator module 1012 may be configured to perform in-between view interpolation on the undistorted rectilinear images based on the optical flow. For example, the view interpolator module 1012 may be configured to perform the in-between view interpolation on undistorted rectilinear images from neighboring cameras. In some examples, the view interpolator module 1012 may be configured to interpolate the undistorted rectilinear images based on a smoothness factor. For example, the smoothness factor can be based on a detected speed of translation of the head mounted display. A light field panorama generator module 1014 may be configured to generate a stereoscopic light field panorama for each perspective using concentric viewing circles. In some examples, the light field panorama generator 1014 may be configured to perform omnistereo stitching using the concentric viewing circles. For example, the light field panorama generator 1014 may be configured to stitch a plurality of slices of a plurality of image planes corresponding to the concentric viewing circles for each perspective. In some examples, the concentric viewing circles can be constrained based on a fixed inter-pupillary distance. A transmitter module 1016 may be configured to receive coordinates corresponding to a perspective from a head mounted display. For example, the coordinates may indicate a translation of the head mounted display. The transmitter module 1016 may be configured to transmit a stereoscopic light field panorama of the perspective corresponding to the coordinates to the head mounted display. In some examples, the transmitter module 1016 may also be configured to transmit an updated stereoscopic light field panorama corresponding to a different perspective to the head mounted display in response to receiving an updated coordinate corresponding to the different perspective.

The block diagram of FIG. 10 is not intended to indicate that the computer readable media 1000 is to include all of the components shown in FIG. 10. Further, the computer readable media 1000 may include any number of additional components not shown in FIG. 10, depending on the details of the specific implementation.

EXAMPLES

Example 1 is a system for generating stereoscopic light field panoramas. The system includes a receiver to receive a plurality of synchronized images. The system also includes a calibrator and projector to calibrate the synchronized images, undistort the synchronized images, and project the undistorted images to a sphere to generate undistorted rectilinear images. The system further includes a disparity estimator to estimate a disparity between neighboring views of the undistorted rectilinear images to determine an optical flow between the undistorted rectilinear images. The system also further includes a view interpolator to perform in-between view interpolation on the undistorted rectilinear images based on the optical flow. The system includes a light field panorama generator to generate a stereoscopic light field panorama for a plurality of perspectives using concentric viewing circles.

Example 2 includes the system of example 1, including or excluding optional features. In this example, the system includes a transmitter to transmit a stereoscopic light field panorama corresponding to a particular perspective to a head mounted display.

Example 3 includes the system of any one of examples 1 to 2, including or excluding optional features. In this example, the concentric viewing circles are to be generated based on a fixed inter-pupillary distance.

Example 4 includes the system of any one of examples 1 to 3, including or excluding optional features. In this example, an amount of the in-between view interpolation to be used is based on a view density threshold and a head motion speed threshold.

Example 5 includes the system of any one of examples 1 to 4, including or excluding optional features. In this example, the stereoscopic light field panoramas each include a plurality of slices of a plurality of image planes corresponding to the concentric viewing circles for each perspective.

Example 6 includes the system of any one of examples 1 to 5, including or excluding optional features. In this example, the synchronized images include objects that were at least a meter away from a circle of cameras used to capture the synchronized images.

Example 7 includes the system of any one of examples 1 to 6, including or excluding optional features. In this example, the plurality of synchronized images are synchronized using audio.

Example 8 includes the system of any one of examples 1 to 7, including or excluding optional features. In this example, the calibrator and projector is to further rectify the undistorted rectilinear images to compensate for a camera misalignment.

Example 9 includes the system of any one of examples 1 to 8, including or excluding optional features. In this example, the system includes a head mounted display to detect a translation and send updated coordinates corresponding to a perspective to the receiver.

Example 10 includes the system of any one of examples 1 to 9, including or excluding optional features. In this example, the system includes a plurality of cameras arranged in a camera ring, wherein the cameras include a plurality of wide angle lenses designed based on a target range of parallax, a radius of a camera ring of the cameras, and a target field of view for the wide angle lenses.

Example 11 is a method for generating stereoscopic light field panoramas. The method includes receiving, via a processor, a plurality of synchronized images. The method also includes calibrating, via the processor, the synchronized images, undistorting the synchronized images, and projecting the undistorted images to a sphere to generate undistorted rectilinear images. The method further includes estimating, via the processor, a disparity between neighboring views of the undistorted rectilinear images to determine an optical flow between the undistorted rectilinear images. The method also further includes performing, via the processor, in-between view interpolation on the undistorted rectilinear images based on the optical flow. The method includes generating, via the processor, a stereoscopic light field panorama for a plurality of perspectives using concentric viewing circles.

Example 12 includes the method of example 11, including or excluding optional features. In this example, the method includes transmitting, via the processor, the stereoscopic light field panorama corresponding to a perspective to a head mounted display in response to receiving coordinates corresponding to the perspective from the head mounted display.

Example 13 includes the method of any one of examples 11 to 12, including or excluding optional features. In this example, the method includes capturing the synchronized images, wherein the synchronized images are synchronized using audio.

Example 14 includes the method of any one of examples 11 to 13, including or excluding optional features. In this example, the concentric viewing circles are constrained based on a fixed inter-pupillary distance.

Example 15 includes the method of any one of examples 11 to 14, including or excluding optional features. In this example, generating the stereoscopic light field panoramic video includes performing omnistereo stitching using the concentric viewing circles.

Example 16 includes the method of any one of examples 11 to 15, including or excluding optional features. In this example, generating the stereoscopic light field panoramic video includes stitching a plurality of slices of a plurality of image planes corresponding to the concentric viewing circles for each perspective.

Example 17 includes the method of any one of examples 11 to 16, including or excluding optional features. In this example, the method includes rectifying the undistorted rectilinear images to compensate for a camera misalignment.

Example 18 includes the method of any one of examples 11 to 17, including or excluding optional features. In this example, the method includes receiving updated coordinates corresponding to a detected translation from a head mounted display and sending an updated stereoscopic light field panorama corresponding to an updated perspective to the head mounted display.

Example 19 includes the method of any one of examples 11 to 18, including or excluding optional features. In this example, an amount of the in-between view interpolation used is based on a view density threshold and a head motion speed threshold.

Example 20 includes the method of any one of examples 11 to 19, including or excluding optional features. In this example, the in-between view interpolation is performed on undistorted rectilinear images from neighboring cameras.

Example 21 is at least one computer readable medium for generating stereoscopic light field panoramas having instructions stored therein that direct the processor to receive a plurality of synchronized images. The computer-readable medium also includes instructions that direct the processor to calibrate the synchronized images, undistort the synchronized images, and project the undistorted images to a sphere to generate undistorted rectilinear images. The computer-readable medium further includes instructions that direct the processor to estimate a disparity between neighboring views of the undistorted rectilinear images to determine an optical flow between the undistorted rectilinear images. The computer-readable medium also further includes instructions that direct the processor to perform in-between view interpolation on the undistorted rectilinear images based on the optical flow. The computer-readable medium also includes instructions that direct the processor to generate a stereoscopic light field panorama for each perspective using concentric viewing circles. The computer-readable medium further includes instructions that direct the processor to receive coordinates corresponding to a perspective from a head mounted display. The computer-readable medium also further includes instructions that direct the processor to transmit a stereoscopic light field panorama of the perspective corresponding to the coordinates to the head mounted display.

Example 22 includes the computer-readable medium of example 21, including or excluding optional features. In this example, the computer-readable medium includes instructions to perform omnistereo stitching using the concentric viewing circles.

Example 23 includes the computer-readable medium of any one of examples 21 to 22, including or excluding optional features. In this example, the computer-readable medium includes instructions to interpolate the undistorted rectilinear images based on a smoothness factor, wherein the smoothness factor is based on a detected speed of translation of the head mounted display.

Example 24 includes the computer-readable medium of any one of examples 21 to 23, including or excluding optional features. In this example, the computer-readable medium includes instructions to rectify the undistorted rectilinear images to compensate for a camera misalignment.

Example 25 includes the computer-readable medium of any one of examples 21 to 24, including or excluding optional features. In this example, the computer-readable medium includes instructions to transmit an updated stereoscopic light field panorama corresponding to a different perspective to the head mounted display in response to receiving an updated coordinate corresponding to the different perspective.

Example 26 includes the computer-readable medium of any one of examples 21 to 25, including or excluding optional features. In this example, the computer-readable medium includes instructions to stitch a plurality of slices of a plurality of image planes corresponding to the concentric viewing circles for each perspective.

Example 27 includes the computer-readable medium of any one of examples 21 to 26, including or excluding optional features. In this example, the computer-readable medium includes instructions to set an amount of the in-between view interpolation based a view density threshold and a head motion speed threshold.

Example 28 includes the computer-readable medium of any one of examples 21 to 27, including or excluding optional features. In this example, the computer-readable medium includes instructions to perform the in-between view interpolation on undistorted rectilinear images from neighboring cameras.

Example 29 includes the computer-readable medium of any one of examples 21 to 28, including or excluding optional features. In this example, the concentric viewing circles are constrained based on a fixed inter-pupillary distance.

Example 30 includes the computer-readable medium of any one of examples 21 to 29, including or excluding optional features. In this example, the computer-readable medium includes instructions to capture images and synchronize the images using audio.

Example 31 is an apparatus for generating stereoscopic light field panoramas. The apparatus includes a receiver to receive a plurality of synchronized images. The apparatus also includes a calibrator and projector to calibrate the synchronized images, undistort the synchronized images, and project the undistorted images to a sphere to generate undistorted rectilinear images. The apparatus further includes a disparity estimator to estimate a disparity between neighboring views of the undistorted rectilinear images to determine an optical flow between the undistorted rectilinear images. The apparatus also further includes a view interpolator to perform in-between view interpolation on the undistorted rectilinear images based on the optical flow. The apparatus further includes a light field panorama generator to generate a stereoscopic light field panorama for a plurality of perspectives using concentric viewing circles.

Example 32 includes the apparatus of example 31, including or excluding optional features. In this example, the apparatus includes a transmitter to transmit a stereoscopic light field panorama corresponding to a particular perspective to a head mounted display.

Example 33 includes the apparatus of any one of examples 31 to 32, including or excluding optional features. In this example, the concentric viewing circles are to be generated based on a fixed inter-pupillary distance.

Example 34 includes the apparatus of any one of examples 31 to 33, including or excluding optional features. In this example, an amount of the in-between view interpolation to be used is based on a view density threshold and a head motion speed threshold.

Example 35 includes the apparatus of any one of examples 31 to 34, including or excluding optional features. In this example, the stereoscopic light field panoramas each include a plurality of slices of a plurality of image planes corresponding to the concentric viewing circles for each perspective.

Example 36 includes the apparatus of any one of examples 31 to 35, including or excluding optional features. In this example, the synchronized images include objects that were at least a meter away from a circle of cameras used to capture the synchronized images.

Example 37 includes the apparatus of any one of examples 31 to 36, including or excluding optional features. In this example, the plurality of synchronized images are synchronized using audio.

Example 38 includes the apparatus of any one of examples 31 to 37, including or excluding optional features. In this example, the calibrator and projector is to further rectify the undistorted rectilinear images to compensate for a camera misalignment.

Example 39 includes the apparatus of any one of examples 31 to 38, including or excluding optional features. In this example, the apparatus includes a head mounted display to detect a translation and send updated coordinates corresponding to a perspective to the receiver.

Example 40 includes the apparatus of any one of examples 31 to 39, including or excluding optional features. In this example, the apparatus includes a plurality of cameras arranged in a camera ring, wherein the cameras include a plurality of wide angle lenses designed based on a target range of parallax, a radius of a camera ring of the cameras, and a target field of view for the wide angle lenses.

Example 41 is a system for generating stereoscopic light field panoramas. The system includes means for receiving a plurality of synchronized images. The system also includes means for to calibrating the synchronized images, undistorting the synchronized images, and projecting the undistorted images to a sphere to generate undistorted rectilinear images. The system further includes means for estimating a disparity between neighboring views of the undistorted rectilinear images to determine an optical flow between the undistorted rectilinear images. The system also further includes means for performing in-between view interpolation on the undistorted rectilinear images based on the optical flow. The system also includes and means for generating a stereoscopic light field panorama for a plurality of perspectives using concentric viewing circles.

Example 42 includes the system of example 41, including or excluding optional features. In this example, the system includes means for transmitting a stereoscopic light field panorama corresponding to a particular perspective to a head mounted display.

Example 43 includes the system of any one of examples 41 to 42, including or excluding optional features. In this example, the concentric viewing circles are to be generated based on a fixed inter-pupillary distance.

Example 44 includes the system of any one of examples 41 to 43, including or excluding optional features. In this example, an amount of the in-between view interpolation to be used is based on a view density threshold and a head motion speed threshold.

Example 45 includes the system of any one of examples 41 to 44, including or excluding optional features. In this example, the stereoscopic light field panoramas each include a plurality of slices of a plurality of image planes corresponding to the concentric viewing circles for each perspective.

Example 46 includes the system of any one of examples 41 to 45, including or excluding optional features. In this example, the synchronized images include objects that were at least a meter away from a circle of cameras used to capture the synchronized images.

Example 47 includes the system of any one of examples 41 to 46, including or excluding optional features. In this example, the plurality of synchronized images are synchronized using audio.

Example 48 includes the system of any one of examples 41 to 47, including or excluding optional features. In this example, the means for to calibrating the synchronized images is to further rectify the undistorted rectilinear images to compensate for a camera misalignment.

Example 49 includes the system of any one of examples 41 to 48, including or excluding optional features. In this example, the system includes means for detecting a translation and sending updated coordinates corresponding to a perspective to the receiver.

Example 50 includes the system of any one of examples 41 to 49, including or excluding optional features. In this example, the system includes a plurality of cameras arranged in a camera ring, wherein the cameras include a plurality of wide angle lenses designed based on a target range of parallax, a radius of a camera ring of the cameras, and a target field of view for the wide angle lenses.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
   at least one memory;
   instructions; and
   at least one processor to execute the instructions to:
      access images of a scene captured by a plurality of cameras, the images including light field information associated with the scene;
      generate, based on first portions of the images, a first stereoscopic light field panorama for a first perspective associated with a left eye viewpoint of the scene, the left eye viewpoint pointing in a first direction extending outward from a left eye position on a first circle; and
      generate, based on second portions of the images, a second stereoscopic light field panorama for a second perspective associated with a right eye viewpoint of the scene, the right eye viewpoint pointing in a second direction extending outward from a right eye position on a second circle, the first circle being different than and concentric to the second circle.

2. The apparatus of claim 1, wherein the at least one processor is to generate a first plurality of stereoscopic light field panoramas for a plurality of different perspectives associated with the left eye viewpoint of the scene, the plurality of different perspectives including the first perspective and other perspectives of the scene associated with a single set of coordinates for the left eye viewpoint.

3. The apparatus of claim 1, wherein an axis of rotation of the first and second circles is located between the left eye position and right eye position.

4. The apparatus of claim 1, wherein the left eye position and right eye position are located on a same axis of rotation of the first and second circles.

5. The apparatus of claim 1, wherein the cameras are arranged in a ring, and an axis of rotation of the first and second circles corresponds to a center of the ring.

6. The apparatus of claim 1, wherein the at least one processor is to:
   provide the first and second stereoscopic light field panoramas to a head mounted display for presentation to a user; and
   in response to translation of the user, provide third and fourth stereoscopic light field panoramas to the head mounted display for presentation to the user, the third and fourth stereoscopic light field panoramas corresponding to different perspectives of the scene than the first and second stereoscopic light field panoramas to create an effect of motion parallax.

7. The apparatus of claim 6, wherein the left eye position is a first left eye position, and the at least one processor is to generate the third stereoscopic light field panorama for a third perspective associated with the left eye viewpoint at a second left eye position on a third circle, the third circle different than and concentric with the first circle.

8. The apparatus of claim 1, wherein the images are first images, and the at least one processor is to:
   determine optical flows between pairs of the first images captured by adjacent ones of the plurality of cameras; and
   generate second images using in-between view interpolation based on the optical flows, the second images representative of views of the scene between ones of the pairs of the images.

9. The apparatus of claim 8, wherein a smoothness factor indicating a number of the second images to be generated for a single pair of the first images is based on at least one of a view density threshold or a head motion speed threshold.

10. At least one computer readable storage device comprising instructions that, when executed, cause at least one processor to at least:
   generate, based on first portions of images of a scene captured by a plurality of cameras, a first stereoscopic light field panorama for a first perspective associated with a left eye viewpoint of the scene, the images including light field information associated with the scene, the left eye viewpoint associated with a left eye position on a first circle, the left eye viewpoint to extend in a first direction away from the first circle; and generate, based on second portions of the images, a second stereoscopic light field panorama for a second perspective associated with a right eye viewpoint of the scene, the right eye viewpoint associated with a right eye position on a second circle, the right eye viewpoint to extend in a second direction away from the second circle, the first circle being different than and concentric to the second circle.

11. The at least one computer readable storage device of claim 10, wherein the instructions cause the at least one processor to generate a first plurality of stereoscopic light field panoramas for a plurality of different perspectives associated with the left eye viewpoint of the scene, the plurality of different perspectives including the first perspective and other perspectives of the scene associated with a single set of coordinates for the left eye viewpoint.

12. The at least one computer readable storage of claim 10, wherein an axis of rotation of the first and second circles is located between the left eye position and right eye position.

13. The at least one computer readable storage device of claim 10, wherein the left eye position and right eye position are located on a same side of an axis of rotation of the first and second circles.

14. The at least one computer readable storage device of claim 10, wherein the instructions cause the at least one processor to:

provide the first and second stereoscopic light field panoramas to a head mounted display for presentation to a user; and in response to translation of the user, provide third and fourth stereoscopic light field panoramas to the head mounted display for presentation to the user, the third and fourth stereoscopic light field panoramas corresponding to different perspectives of the scene than the first and second stereoscopic light field panoramas to create an effect of motion parallax.

15. The at least one computer readable storage device of claim 14, wherein the left eye position is a first left eye position, and the instructions cause the at least one processor to generate the third stereoscopic light field panorama for a third perspective associated with the left eye viewpoint at a second left eye position on a third circle, the third circle different than and concentric with the first circle.

16. A method comprising:

generating, by executing an instruction with at least one processor, a first stereoscopic light field panorama based on first portions of images of a scene captured by a plurality of cameras, the images including light field information associated with the scene, the first stereoscopic light field panorama for a first perspective associated with a left eye viewpoint of the scene, the left eye viewpoint associated with a first view at a left eye position on a first circle, the first view pointing in a first direction away from the first circle; and generating, by executing an instruction with the at least one processor, a second stereoscopic light field panorama based on second portions of the images, the second stereoscopic light field panorama for a second perspective associated with a right eye viewpoint of the scene, the right eye viewpoint associated with a second view at a right eye position on a second circle, the second view pointing in a second direction away from the second circle, the first circle being different than and concentric to the second circle.

17. The method of claim 16, further including generating a first plurality of stereoscopic light field panoramas for a plurality of different perspectives including the first perspective and other perspectives of the scene associated with a single set of coordinates for the left eye viewpoint.

18. The method of claim 16, wherein an axis of rotation of the first and second circles is located between the left eye position and right eye position.

19. The method of claim 16, wherein the left eye position and right eye position are located on a same side axis of rotation of the first and second circles.

20. The method of claim 16, further including:

providing the first and second stereoscopic light field panoramas to a head mounted display for presentation to a user; and in response to translation of the user, providing third and fourth stereoscopic light field panoramas to the head mounted display for presentation to the user, the third and fourth stereoscopic light field panoramas corresponding to different perspectives of the scene than the first and second stereoscopic light field panoramas to create an effect of motion parallax.

21. The method of claim 20, wherein the left eye position is a first left eye position, the method further including generating the third stereoscopic light field panorama for a third perspective associated with the left eye viewpoint at a second left eye position on a third circle, the third circle different than and concentric with the first circle.

* * * * *